MICROWAVE PHASE DISPERSER

Filed July 15, 1966 3 Sheets-Sheet 1

INVENTOR
H.B. FROST
BY *David P. Kelley*
ATTORNEY

FREQUENCY NORMALIZED TO 1 G.C.
PARAMETER: CAPACITANCE IN pf A=0.010, B=0.200, C=0.400, D=0.600, E=0.800, F=1.000, G=1.200

FREQUENCY NORMALIZED TO 1 G.C.
PARAMETER: CAPACITANCE IN pf A=0.010, B=0.200, C=0.400, D=0.600, E=0.800, F=1.000, G=1.200

June 23, 1970 H. B. FROST 3,517,348

MICROWAVE PHASE DISPERSER

Filed July 15, 1966 3 Sheets-Sheet 3

United States Patent Office
3,517,348
Patented June 23, 1970

3,517,348
MICROWAVE PHASE DISPERSER

Harold B. Frost, Wyomissing, Pa., assignor to Bell Telephone Laboratories, Incorporated, Murray Hill and Berkeley Heights, N.J., a corporation of New York Filed July 15, 1966, Ser. No. 565,559
Int. Cl. H03h 7/34, 7/36
U.S. Cl. 333—31 3 Claims

ABSTRACT OF THE DISCLOSURE

In a stripline transmission system a phase disperser comprises a planar conductor conductively insulated from one or more ground planes, an input and an output terminal on the planar conductor, a one-quarter wavelength portion of stripline connected across the terminals and a variable capacitor coupled across the ends of the quarter wavelength section for varying the slope of the dispersion characteristic of the transmission system.

This invention relates to electromagnetic wave transmission systems and more specifically to phase dispersers for use in such systems.

The phase shift between the input and output of a high frequency transmission system is related to the time required for wave energy to propagate through the system. In most high frequency transmission systems, however, waves of different frequencies propagate at different velocities, thus some frequency components are delayed longer than others and phase (or time-delay) distortion results.

In a microwave system having a plurality of physically separate transmission channels, all operating over the same band of frequencies, it may be preferable, or necessary, for the particular system that the phase-versus-frequency characteristics of all the channels of the multichannel transmission system be substantially identical over a given band of frequencies. In order to achieve such uniformity of characteristics, it is generally the practice to include three equalizing networks; namely, (1) a linestretcher, capable of adjusting the average phase shift, (2) a disperser, capable of adjusting the slope of the phase characteristic (i.e., the dispersion), and (3) an equalizing network capable of adjusting the phase ripple components of each transmission channel.

A multichannel transmission system may contain in each channel a balanced transistor amplifier of the type disclosed, for example, in the copending application of R. S. Engelbrecht, Ser. No. 407,745, filed Oct. 30, 1964, and assigned to applicant's assignee. It is necessary in some applications of such a system that the phase-versus-frequency characteristic of the stripline amplifiers in each channel be substantially identical over a given band of frequencies.

It is, accordingly, the broad object of the invention to delay, in a prescribed manner, the phase of high frequency wave energy over a range of frequencies, for example, in order to control the slope of the phase-versus-frequency characteristic of a transmission system.

Microwave phase equalizers well known in the art generally are capable of correcting both average phase and phase slope; that is, they are inherently both line-stretchers and dispersers. Typically such equalizers comprise either a tapped delay line and a summing network as shown, for example, in U.S. Pat. 2,790,956 of R. W. Ketchledge issued on Apr. 30, 1957; or reflecting stubs combined with a circulator or a hybrid as shown, for example, in the copending application of R. S. Engelbrecht, Ser. No. 468,742, filed July 1, 1965, and assigned to applicant's assignee. Prior art phase equalizers typically employ sliding electrical contacts which can produce noise. Furthermore, such techniques are sometimes bulky and expensive. (For a summary of prior phase equalizers see also "Investigation of Microwave Phase and Time Delay Equalizers," S. B. Cohn and E. N. Torgow, 1st Quarterly Report, June 1st to Aug. 31, 1964, Rantec Corporation, AD 454664.)

It is, therefore, another object of this invention to control microwave dispersion with reduced use of stubs, circulators or hybrids, or other components which might produce electrical noise.

In accordance with an illustrative embodiment of the present invention, the slope of the phase-versus-frequency characteristic of a transmission system is controlled by means of a phase disperser comprising a nonsinusoidal one-quarter wavelength (at the midband frequency) portion of stripline shunted by a variable capacitor. Since the primary purpose of the quarter wavelength stripline portion is to provide a transmission path, and not inductance as in prior art devices, it need not be sinusoidal in shape. It is a principal feature of the invention that the capacitor is connected between consecutive points along the transmission line itself (active plane) rather than between the active and ground planes as in prior art devices. The phase disperser is connected into each transmission channel whose dispersion is to be controlled, typically in series with a stripline amplifier.

The dispersion of the amplifier can be controlled by variations of the capacitor so as to make the slope of the phase-versus-frequency characteristic substantially identical with that of all other amplifiers. The average slope of each amplifier can be controlled by any well-known stripline line-stretcher. The invention ordinarily requires no circulators or hybrids, and consequently is more compact and less expensive than prior phase equalizers. Electrical noise problems have been reduced by the elimination of sliding electrical contacts. Furthermore, its simple structure can be readily fabricated by well-known stripline techniques.

The above and other objects of the invention, together with its various features and advantages, can be easily understood from the following more detailed discussion, taken in conjunction with the accompanying drawings, in which.

Figure 1A:
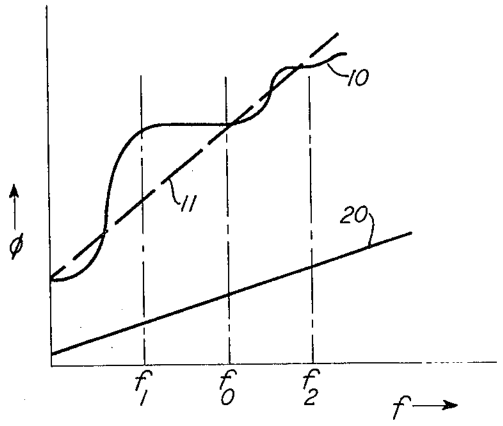
FIGS. 1A and 1B show an arbitrarily general phase-versus-frequency characteristic of a stripline amplifier and the components thereof, respectively.

Referring more specifically to the drawings, curve 10 of FIG. 1A represents an arbitrarily general phase-versus-frequency characteristic. Curve 10 can be the transmission characteristic of some transmission system: a transmission line, an amplifier, a circuit component or any combination thereof. Line 20, by way of contrast, represents the desired linear phase-versus-frequency characteristic of a distortion free transmission system. The dashed lines, indicating an upper frequency $f_2$ and a lower frequency $f_1$, define the frequency band over which the system is to be equalized. The midband frequency is designated $f_0$, typically one gigacycle.

Figure 1B:
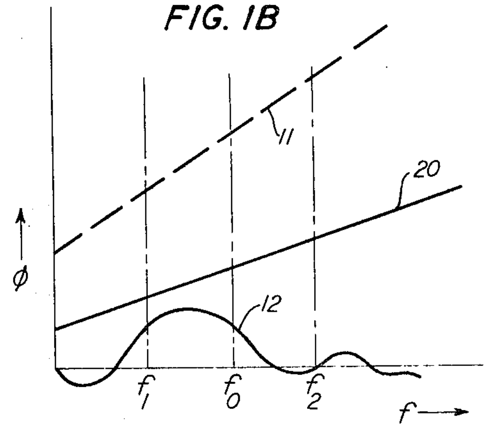

Line 11 and curve 12 of FIG. 1B are representations of the component parts of curve 10. Line 20 is also shown for the purpose of comparison. Referring to FIG. 1B, line 11 represents the average phase component of the phase characteristic represented by curve 10. The phase-slope, or dispersion, is represented by the slope of line 11, and curve 12 represents the phase ripple component of this phase characteristic. It can be seen that by combining line 11 and curve 12 algebraically, the overall phase characteristic represented by curve 10 of FIG. 1A is obtained.

The technique of phase equalization includes transforming the actual characteristic of a transmission system represented by curve 10 into the desired linear output characteristic represented by line 20. This technique involves (1) ripple adjustment—making curve 10 of FIG. 1A linear, (2) dispersion adjustment—rotating line 11 of FIG. 1B until it is parallel to line 20, and (3) line-stretching—translating the line 11 of FIG. 1B until it is coincident with the desired linear output line 20.

This invention is directed to the second step of the phase equalization technique—the control of dispersion.

Figure 2:
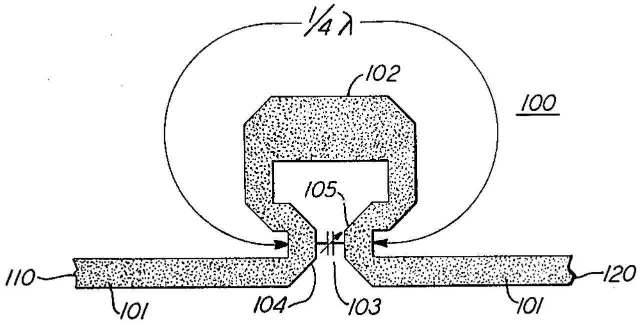
FIG. 2 is a schematic illustrative of one embodiment of the invention.

Turning now to FIG. 2, there is shown a schematic illustrative of the active plane only of the stripline phase disperser 100. In accordance with the principles of this invention, the phase disperser 100 comprises a low impedance quarter-wavelength (at the midband frequency) portion 102 of stripline shunted by a variable capacitor 103. The capacitor 103 is connected along the stripline itself, not between the active and ground planes.

Figure 3:
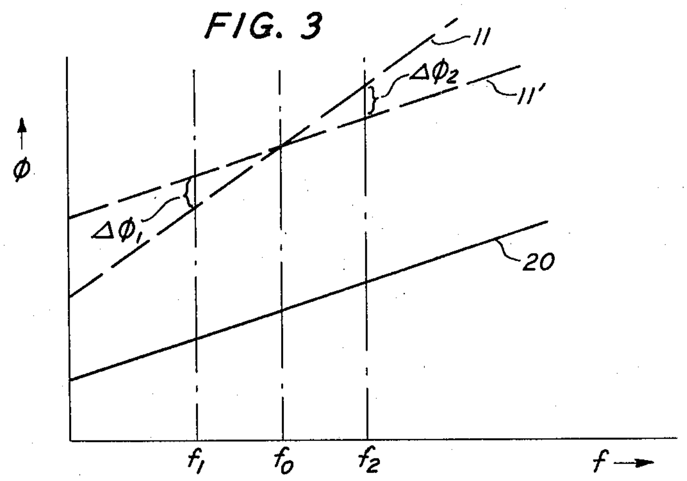
FIG. 3 shows typical adjustments of phase slope.

By adjustment of the capacitance of the variable capacitor 103, the slope of the phase-versus-frequency characteristic can be controlled. Referring to FIG. 3, the line 11 represents the phase-characteristic of a typical strip line transmission system, typically an amplifier, with the ripple component equalized but without line-stretching or dispersion equalization. By insertion of the phase equalized 100 the line 11 is caused to rotate, becoming line 11′, by increasing the capacitance of capacitor 103. Line 11′, which is parallel to the desired linear output response represented by line 20, can be translated so as to coincide with line 20 by any of well-known line-stretching techniques.

The sum of the change in phase magnitude $\Delta\varphi_2$ and $\Delta\varphi_1$ at the upper and lower frequencies $f_2$ and $f_1$, respectively, is termed the dispersion control. The present invention is capable of providing about ten degrees of dispersion control. Thus, in the sense the maximum disperson control is obtained, one-quarter wavelength is the "optimum" length of the portion 102 shown in FIG 2.

Figure 4:
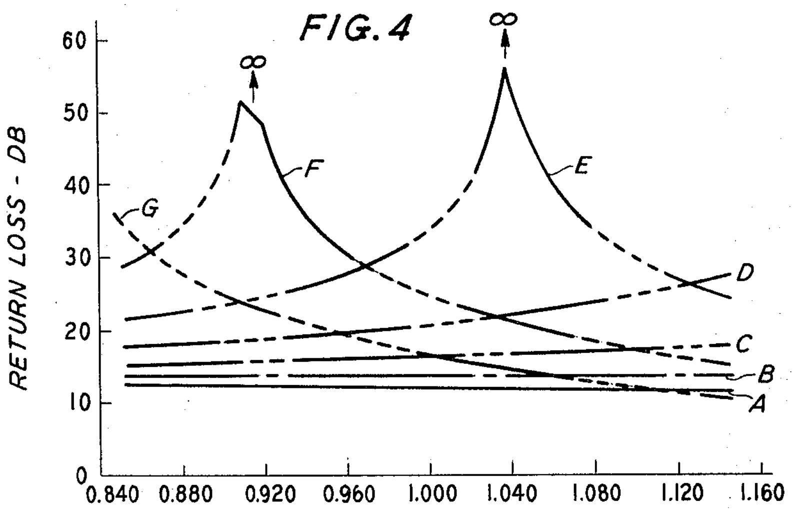
FIG. 4 shows the theoretical return loss characteristics of the disperser with the variable capacitance as a parameter.

As mentioned previously, the quarter-wavelength portion 102 as shown in FIG. 2 has a low impedance with respect to the impedance of main stripline 101. The low impedance is obtained by making the portion 102 physically wider than the main stripline 101. Typically, the width of the main stripline 101 is 115 mils and that of the portion 102 is about 250 mils. The purpose of the low impedance portion is to minimize reflection of transmitted energy and thus to maximize return loss. FIG. 4 shows the theoretical return loss characteristics of an embodiment of the invention over a 0.320 gigacycle range centered at 1.000 gigacycles. In FIG. 4 the width of the portion 102 is fixed at 250 mils, but the capacitance of the disperser 100 is varied to obtain the family of curves shown. Curve E, for example, which represents the return loss characteristic of the disperser 100 when its capacitance is 0.800 pf., exhibits a peak return loss (which, though not shown, theoretically is infinite) at about 1.040 gigacycles. With increasing capacitance, as shown in curves F and G representing capacitances of 1.000 and 1.200 pf., respectively, the position of the peak decreases in frequency. It will be noted that because the peaks for curves A, B, C, D and G lie outside the 0.320 gigacycle range, they are not shown in FIG. 4.

Figure 5:
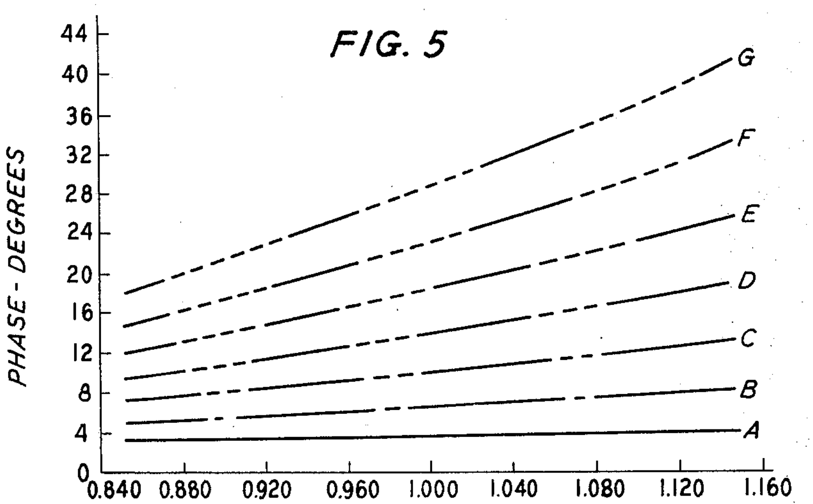
FIG. 5 shows the theoretical phase-versus-frequency characteristic of the disperser with the variable capacitance as a parameter.

The ideal phase-versus-frequency characteristic of the disperser itself is preferably linear within the frequency band of interest. FIG. 5 shows the theoretical phase characteristics of an embodiment of the invention having represents the substantially linear phase characteristic of as indicated previously for FIG. 4. Curve E, for example, the same dimensions and over the same frequency range the disperser 100 when its capacitance is 0.800 pf. When the capacitance is increased, both the slope and the average value of the phase characteristic is increased, as shown by curves F and G which represent capacitance values of 1.000 pf. and 1.200 pf., respectively.

Figure 6:
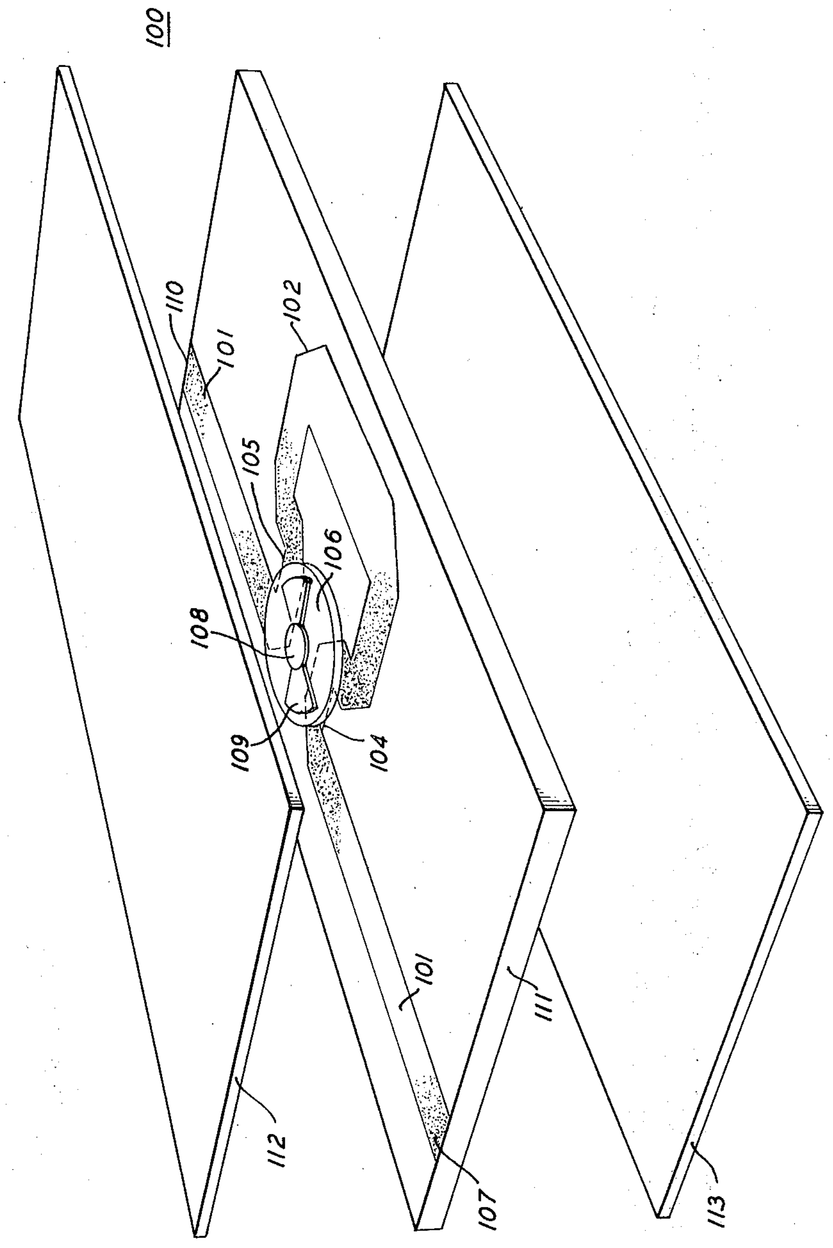
FIG. 6 is an exploded perspective view of the same embodiment of the invention.

FIG. 6 is an exploded perspective view of the microwave phase disperser 100 in a stripline configuration. The inner or active conductor of the circuit is printed, etched, or otherwise bonded to the active plane 111, a thin sheet of dielectric material about 25 mils in thickness, and located between upper and lower ground planes 112 and 113. The ground planes are each separated from the active plane 111 by about 50 mils and conductively insulated from it by an air layer.

In the following discussion corresponding circuit components of FIG. 6 will be identified with identical numerals where applicable to facilitate comparison of FIGS. 2 and 6. Thus, in FIG. 6, the main stripline 101 is shaped in the form of a loop, the input and output terminals 104 and 105, respectively, of the loop being adjacent to one another. Rotatably mounted in the active plane 111 is a conductive butterfly 109, concentrically disposed with respect to the ceramic screw 108 which is fixed in the active plane 111. The conductive butterfly 114, typically a Be-Cu alloy, has a length greater than the distance between the terminals 104 and 105 of the phase disperser 100; and is conductively insulated from the terminals 104 and 105 by means of a dielectric ring 106, typically Mylar, thereby forming a capacitor between the terminals 104 and 105, and hence along the main stripline 101.

In operation, a transmission system, typically a stripline amplifier, is connected to the input end 107, and a load, typically additional amplifier stages, is connected to the output end 110, of the phase disperser 100. Rotation of the conductive butterfly 109 changes the capacitance connected along the main stripline 101, thereby delaying the phase of high frequency energy transmitted along the main stripline 101, in prescribed manner as shown in FIG. 5, and thus allowing phase dispersion to be controlled.

As previously mentioned, in order to obtain a low impedance, the portion 102 of the loop is made physically wider than the main stripline 101, thereby reducing wave energy reflection and thus increasing return loss. The minimum return loss of the phase disperser 100 is typically about 13 db.

The phase disperser 100, in addition to being compact, inexpensive, and easily fabricated, advantageously reduces electrical noise problems. Because the conductive butterfly 109 is conductively insulated from the stripline by the dielectric ring 106, current flow therebetween depends on capacitance only, not upon contact. Consequently rotation of the butterfly does not create the electrical noise problems inherent in prior phase equalizers which use sliding electrical contacts.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A phase disperser for use in stripline transmission systems havings signals at a range of frequencies propagating thereon, the stripline transmission system having a phase-versus-frequency characteristic whereby signals at the higher frequencies of said range travel at lower velocities than signals at the lower frequencies of said range, whereby the higher frequencies undergo greater phase shift than the lower frequencies, said phase disperser comprising an active conductive planar member conductively insulated from one or more ground planes, an input and an output terminal adjacent one another on said planar member, a non-sinusoidal one-quarter wavelength portion of stripline one end of which is connected to said input terminal and the other end of which is connected to said output terminal, and variable capacitance means coupled from one end of said portion of stripline to the other end for varying the slope of the phase-versus-frequency characteristic of the stripline transmission system.

2. The phase disperser of claim 1 wherein said capacitively coupled means for varying the slope of the phase-versus-frequency characteristic comprises a conductive member rotatably mounted adjacent said active plane and having a length greater than the distance between said input and output terminals, and an insulative member disposed between said conductive member and said ends of said one-quarter wavelength portion of stripline.

3. The phase disperser of claim 2 wherein:

a section of said one-quarter wavelength portion of stripline is substantially wider than the remainder of said stripline thereby to decrease the impedance of said section with respect to the remainder of said stripline, whereby the reflection of wave energy is reduced and return loss is increased.

References Cited

UNITED STATES PATENTS

| | | | |
|---|---|---|---|
| 2,751,558 | 6/1956 | Grieg | 333—73 |
| 3,114,121 | 12/1963 | Jordan | 333—29 |
| 3,139,597 | 6/1964 | French et al. | 333—31 |
| 3,005,168 | 10/1961 | Fye | 333—31 |
| 2,915,717 | 12/1959 | La Rosa | 333—82 |
| 2,961,620 | 11/1960 | Sommers | 333—31 |

HERMAN KARL SAALBACH, Primary Examiner

C. BARAFF, Assistant Examiner

U.S. Cl. X.R.

333—28, 84